United States Patent [19]
Straub

[11] Patent Number: 6,050,392
[45] Date of Patent: Apr. 18, 2000

[54] CLEANING DEVICE AND PROCESS

[75] Inventor: Karlheinz Straub, Heidenheim, Germany

[73] Assignee: Voith Sulzer Papiermaschinen GmbH, Heidenheim, Germany

[21] Appl. No.: 09/013,261

[22] Filed: Jan. 26, 1998

[30] Foreign Application Priority Data

Jan. 27, 1997 [DE] Germany .................... 197 02 793

[51] Int. Cl.[7] .................................................. B65G 45/00
[52] U.S. Cl. .......................................................... 198/495
[58] Field of Search .................... 198/495, 493, 198/494

[56] References Cited

U.S. PATENT DOCUMENTS

| | | |
|---|---|---|
| 1,255,977 | 2/1918 | Bemis, Sr. . |
| 3,305,108 | 2/1967 | Edming ................................ 198/493 |
| 5,024,319 | 6/1991 | Dixon et al. ........................... 198/494 |
| 5,372,242 | 12/1994 | McInnes et al. ....................... 198/495 |
| 5,783,044 | 7/1998 | Schneider et al. . |

FOREIGN PATENT DOCUMENTS

| | | |
|---|---|---|
| 0731212 | 9/1996 | European Pat. Off. . |
| 2508629 | 10/1975 | Germany ............................... 198/495 |
| 2944340 | 5/1981 | Germany . |
| 2739681 | 10/1981 | Germany . |
| 4322565 | 12/1993 | Germany . |
| 265809 | 10/1990 | Japan ................................... 198/494 |
| 94/12349 | 6/1994 | WIPO . |

Primary Examiner—Joseph E. Valenza
Assistant Examiner—Joe Dillon, Jr.
Attorney, Agent, or Firm—Greenblum & Bernstein, P.L.C.

[57] ABSTRACT

A device for cleaning a conveyer belt, in particular a dry or wet sieve belt or a felt belt, of a machine for manufacturing a material web, in particular a paper or cardboard web, is disclosed. At least one nozzle that can be directed toward the conveyer belt for spraying this conveyer belt with a gaseous or liquid agent is provided, and the device also includes a bell-shaped cleaning hood surrounding the cleaning nozzle in a sleeve-shaped manner. At least one additional nozzle is provided in peripheral regions of the bell-shaped cleaning hood. A process for cleaning a conveyor belt of a machine utilizing the above device is also provided.

26 Claims, 1 Drawing Sheet

CLEANING DEVICE AND PROCESS

CROSS-REFERENCE OF RELATED APPLICATION

The present invention claims the priority under 35 U.S.C. §119 of German Patent Application No. 197 02 793.8 filed on Jan. 27, 1997, the disclosure of which is expressly incorporated by reference herein in its entirety.

BACKGROUND OF THE INVENTION

1. Field of the Invention

The invention relates to a device for cleaning a conveyer belt, in particular a dry or a wet sieve belt or a felt belt, of a machine for the production of a material web, in particular a paper web or a cardboard web.

2. Discussion of Background Information

Cleaning devices which include a cleaning nozzle encircled by a bell-shaped cleaning hood are known. Such devices are used for cleaning a conveyer belt of a machine that produces a material web. The cleaning nozzle applies a cleansing agent to the conveyer belt which removes the contamination from the surface of the conveyer belt, for example material web fibers, adhesives, or additives, or the like. The bell-shaped cleaning hood shields the portion of the conveyer belt to be cleaned from the surroundings. It has been observed that the result of cleaning is not always sufficient and satisfactory. In some cases, dissolved dirt particles and cleansing agent remain on the surface of the conveyer belt, which are then carried out of the bell-shaped cleaning hood by the conveyer belt. This results not only in a contamination of the machine but also in an undesirable impairment of the material web characteristics.

SUMMARY OF THE INVENTION

The task of the invention, therefore, is to create a cleaning device of the type mentioned above which does not exhibit these disadvantages.

In order to achieve this task, a cleaning device of the type mentioned above is provided with at least one additional nozzle arranged in the peripheral region of the bell-shaped cleaning hood. The additional nozzle applies a cleansing agent to the conveyer belt in the region of the bell-shaped cleaning hood. Accordingly, the transport of dirt particles found on the surface of the conveyer belt, which have been dissolved by the cleaning nozzle, out of the bell-shaped cleaning hood and the transport of the cleansing agent, which has been applied by the cleaning nozzle onto the conveyer belt, is hereby very safely achieved. Due to the additional nozzle, the effectiveness of the cleaning device, that is, its effectiveness in cleaning, is improved in a simple manner so that disruptive influences during the production of the material web, such as a re-moistening of the material web by the cleaning agent present on or in the conveyer belt, are reduced.

An embodiment of the cleaning device is provided, wherein the cleansing medium flowing from the additional nozzle strikes the cleansing area at least substantially tangentially and is pointed toward the interior of the bell-shaped cleaning hood. The cleansing medium is thus applied to the surface of the conveyer belt in such a way that one of the force components produced by the emanating cleansing medium runs parallel or roughly parallel to the surface of the conveyer belt. Contamination, such as particles on the surface of the conveyer belt, is thereby stripped away and can be removed from the cleansing area. Cleansing agent present on the conveyer belt surface is also hereby removed and carried away.

A preferred embodiment of the cleaning device is characterized by a guide vane, which diverts the cleansing agent streaming from the additional nozzle, away from the cleansing surface. The diversion occurs upwards, as seen from the cleaning surface. The cleansing agent is thus diverted away from the surface of the conveyer belt. This leads to a high removal rate of the contamination which is dissolved by the cleansing agent and carried away, as well as of the cleaning fluid present on the conveyer belt surface.

An embodiment of the cleaning device is especially preferred in which the interior of the bell-shaped cleaning hood can be provided with a partial vacuum. The removal of the cleansing agent, the contamination dissolved therein, and the removed contamination from the cleansing area or the cleansing surface, is further improved by suctioning the interior of the bell-shaped cleaning hood, which is connected to a vacuum mechanism.

A further embodiment of the cleaning device is also provided in which the cleansing medium is fed into the interior of the bell-shaped cleaning hood under excess pressure, thereby causing a suction effect. The cleansing agent which is blown from, or emanates under pressure from, the additional nozzle is directed onto the cleansing surface in such a way that at least one locally confined vacuum zone develops in the vicinity of the flow. This is designed preferably to be near the cleansing surface, that is, where the dirt particles and the cleansing agent from the cleaning nozzle are removed from conveyer belt surface. A renewed adhesion of the already dissolved contamination on the conveyer belt is thereby safely avoided and removal of the contamination from the cleansing area assisted or achieved.

Another embodiment of the cleaning device is provided, wherein the interior of the bell-shaped cleaning hood is suctioned and the cleansing medium is sucked into the interior of the bell-shaped cleaning hood through the additional nozzle. Both the conveyer belt segment enclosed by the bell-shaped cleaning hood and the additional nozzle are suctioned by the interior chamber connected to a vacuum source. An additional excess pressure hook-up to draw the cleansing agent through the additional nozzle into the interior of the bell-shaped cleaning hood is not necessary, so that the construction of the cleansing device is simplified and its production costs are reduced.

A further embodiment of the invention includes a process for cleaning a conveyer belt of a machine for manufacturing a material web, in particular a paper or cardboard web. The process includes spraying the conveyer belt with a cleansing agent from at least one cleaning nozzle in a direction toward the conveyer belt, forming an interior chamber surrounding the cleaning nozzle by providing a bell-shaped cleaning hood positioned over the conveyer belt, and spraying the conveyor belt with cleansing agent from at least one additional nozzle provided in a peripheral region of the bell-shaped cleaning hood. The process may also include striking a cleansing area of the belt with the cleansing agent from the at least one additional nozzle substantially tangentially and in a direction toward the interior chamber of the bell-shaped cleaning hood.

According to other embodiments of the invention, the process for cleaning a conveyor belt may further include diverting the cleansing agent emanating from the at least one additional nozzle away from the surface of the cleansing area; providing a partial vacuum within the interior chamber of the bell-shaped cleaning hood; introducing the cleansing agent into the interior chamber of the bell-shaped cleaning hood in a pressurized state and thereby causing a suction effect; and, providing the interior chamber of the bell-shaped cleaning hood with a vacuum, and sucking the cleansing agent through the at least one additional nozzle into the interior chamber.

BRIEF DESCRIPTION OF THE DRAWINGS

The present invention is further described in the detailed description which follows, in reference to the noted drawing by way of non-limiting examples of preferred embodiments of the present invention, wherein like reference numerals represent similar parts throughout the several views of the drawings, and wherein.

DETAILED DESCRIPTION OF THE INVENTION

The particulars shown herein are by way of example and for purposes of illustrative discussion of the present invention only and are presented in the cause of providing what is believed to be the most useful and readily understood description of the principles and conceptual aspects of the invention. In this regard, no attempt is made to show structural details of the invention in more detail than is necessary for the fundamental understanding of the invention, the description taken with the drawings making apparent to those skilled in the art how the several forms of the invention may be embodied in practice.

Figure 1:
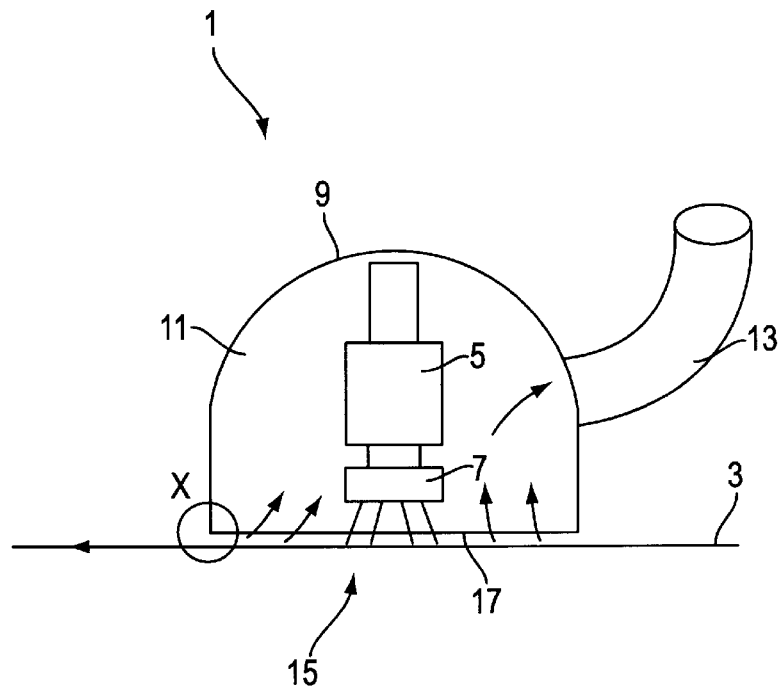
FIG. 1 illustrates a schematic side view of an embodiment of the cleaning device in accordance with the invention.

FIG. 1 shows a section of a machine (not illustrated here) for manufacturing a material web, in which a device 1 for cleaning a conveyer belt 3 of the machine is arranged. Generally, the cleaning device 1 can be used for any conveyer belts, for example for sieve belts or the felts of a sieve, press or drying section of a machine for manufacturing a material web, in particular a paper or cardboard web. The following describes a conveyer belt of a paper making machine designed as a dry sieve belt purely as an example.

The cleaning device 1 depicted in FIG. 1 comprises a cleaning nozzle 5 designed as a rotor nozzle, which exhibits a rotatable nozzle head 7 with a nozzle arrangement (not illustrated). The nozzle arrangement can comprise one or more driving jets, which serve to produce a rotational motion, as well as one or more cleaning nozzles which spray the conveyer belt 3 with a cleaning medium. In place of or in addition to the driving jets, the rotational motion of the nozzle arrangement also can be produced or assisted by means of an electric, air, or hydraulic motor. The medium for cleaning the conveyer belt 3 emanating from the cleaning nozzle 5 can be liquid or gaseous, for example vapor. In the following, it is assumed purely for the sake of example that the agent flowing from the cleaning nozzle 5 is a liquid. The cleaning nozzle 5 is enclosed by a bell-shaped cleaning hood 9, which is designed in the shape of a sleeve. The interior chamber 11 of the bell-shaped cleaning hood 9 is connected to a vacuum unit (not illustrated here) by means of a connecting line 13. A high pressure hose, which can be connected to a high pressure pump for supplying the cleaning nozzle 5 with liquid, may be attached to the cleaning nozzle 5.

The cleaning device 1 is arranged on a traversing wagon (not illustrated here) for facilitating movement, which may be shifted transversely in the moving direction of the conveyer belt 3. A device of this type for the operation of the cleaning device is generally known, so that it will not be discussed in more detail here.

An end section 15 of the bell-shaped cleaning hood 9 is adapted to the conveyer belt 3, running in the direction of the arrows, such that the distance or opening between the bell-shaped cleaning hood 9 and the conveyer belt 3, which is preferably constant along an edge 17 of the end area 15, can be variably adjusted. The cleaning nozzle 5 in this example of the embodiment is designed along the center of and completely surrounded by the bell-shaped cleaning hood 9. The cleaning nozzle 5 may be repositioned inside the bell-shaped cleaning hood 9, preferably toward the moving direction of the conveyer belt. Due to the off-center arrangement, it is possible to apply a partial vacuum for a longer period of time to the segment of the conveyer belt which is sprayed with liquid by the cleaning nozzle 5, or, in other words, to increase the traversed distance of the cleansed segment of the conveyer belt in the interior chamber 11 of the bell-shaped cleaning hood 9.

Figure 2:
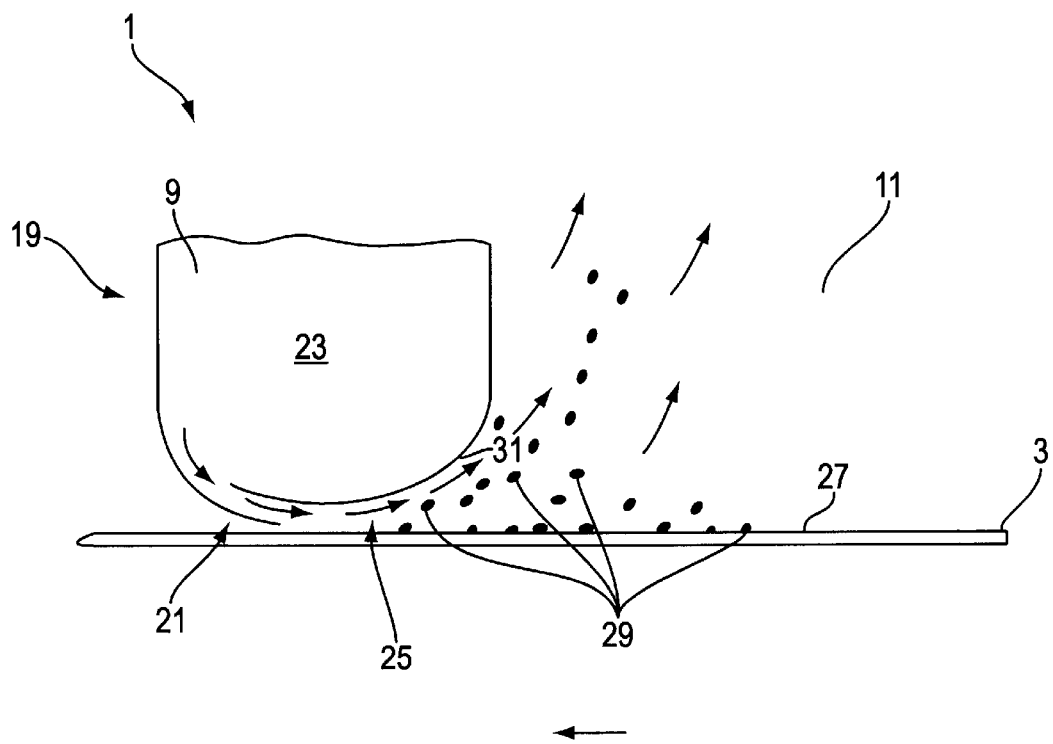
FIG. 2 illustrates a highly enlarged section of the cleaning device according to FIG. 1.

FIG. 2 shows a highly enlarged detail of the area of the cleaning device 1 marked with an "X" in FIG. 1, namely a peripheral region 19 of the bell-shaped cleaning hood 9, in which an additional nozzle 21 is arranged. Here, the additional nozzle 21 is designed in the sleeve wall 23 of the bell-shaped cleaning hood 9 near the open-ended end section 15 of the bell-shaped cleaning hood. The additional nozzle 21 is aligned in such a way that the emanating cleansing agent is directed into the interior of the bell-shaped cleaning hood 9 and so that it strikes the cleansing area 25 tangentially. The cleansing medium emanating from the additional nozzle 21 can be gaseous, such as vapor or air, or liquid. The flow of the preferably gaseous cleansing agent is noted here with arrows. The supply of the additional nozzle 21 with the cleansing agent occurs via ducts (not illustrated), which are designed in the sleeve wall 23 of the bell-shaped cleaning hood 9.

In this embodiment of the cleaning device, the sleeve wall 23 provides a guide vane 31 on the side which faces the interior chamber 11 of the bell-shaped cleaning hood 9 and is designed in one piece with the sleeve wall 23. The guide vane 31 has a curvature which extends from the side facing the interior 11 of the sleeve wall 23 right up to the additional nozzle 21, that is, to the cleansing area 25. The function of the guide vane 31 will be discussed in more detail below. The flow of the cleansing agent emanating from the additional nozzle 21, which flow is marked with arrows, strips contamination 29, for example particles, dirt and/or cleaning fluid, from the surface 27 of the conveyer belt 3 to be cleaned and carries these away. The flow of the cleansing medium emanating from the additional nozzle 21 thereby positions itself on the contour of the guide vane 31 (Coanda Effect) and is directed upwards. Due to this measure, it is guaranteed that the contamination 29 is carried out of the cleansing area 25 and is transported away. By removing the contamination by means of the cleansing agent coming from the additional nozzle 21, the suction effect of the bell-shaped cleaning hood 9 is assisted and the cleaning efficiency of the cleaning device 1 is improved. The main cleaning of the conveyer belt 3 is executed from the rotatable nozzle head 7 or the cleaning nozzle 5. By means of the additional nozzle 21, the cleaning results of the cleaning device 1 are further improved.

In another embodiment of the cleaning device 1, the additional nozzle 21 is designed as a slit nozzle, which reaches across a partial periphery or the entire peripheral region of the bell-shaped cleaning hood 9. In another embodiment of the cleaning device, several additional nozzles are designed, which are arranged in the peripheral regions of the bell-shaped cleaning hood, for example uniformly distributed over the periphery of the bell-shaped cleaning hood. Alternatively, the additional nozzle can be arranged in the embodiment described above in such a way that the cleansing agent coming from the additional nozzle strikes the cleaning surface 25 at a preferably acute angle.

Supplying the additional nozzle with pressurized air is also contemplated, so that the air can be blown into the bell-shaped cleaning hood. Furthermore, it is possible to apply a partial vacuum to the additional nozzle 21 with the connecting line 13 connected to a vacuum source, whereby the construction of the cleaning device can be simplified and the operating costs can be reduced. It is also conceivable that a cleansing fluid be sprayed in through the additional nozzle 21 and directed onto the cleansing area 25. A good cleaning efficiency is thereby provided, even with very highly contaminated conveyer belts.

In another advantageous embodiment of the cleaning device, which is especially suitable for cleaning conveyer belts with coarse meshes or large pores, the guide vane 31 is designed to divert the cleansing agent emanating from the additional nozzle 21 such that it hits the surface of the conveyer belt. Dissolved dirt particles and cleansing agent are thereby guided or pressed through the conveyer belt, so that they exit on the reverse side of the conveyer belt. This contamination can be transported out of the machine from the reverse side with appropriate transport mechanism. With such a cleaning device, both sides of the conveyer belt 3 are effectively cleaned in a simple manner.

The additional nozzle 21 is preferably arranged subsequent to the cleaning nozzle 5, as observed from the direction of movement of the transport of the conveyer belt 3. By positioning the additional nozzle 21 subsequent to the cleaning nozzle 5 in this way, a force component is directed against the transport direction of the conveyer belt 3 in an advantageous manner, so that the cleaning efficiency is particularly high.

The cleaning device 1 is characterized by a simple construction and by a high cleaning efficiency. In a further advantageous embodiment of the cleansing device 1, the additional nozzle 21 applies warm, preferably hot, dry air onto the conveyer belt, whereby, in addition to a cleaning of the conveyer belt and a removal of contamination, a moisture content reduction of the conveyer belt can also be achieved, so that a re-moistening of the material web can essentially be eliminated.

It is noted that the foregoing examples have been provided merely for the purpose of explanation and are in no way to be construed as limiting of the present invention. While the invention has been described with reference to a preferred embodiment, it is understood that the words which have been used herein are words of description and illustration, rather than words of limitation. Changes may be made, within the purview of the appended claims, as presently stated and as amended, without departing from the scope and spirit of the invention in its aspects. Although the invention has been described herein with reference to particular means, materials and embodiments, the invention is not intended to be limited to the particulars disclosed herein; rather, the invention extends to all functionally equivalent structures, methods and uses, such as are within the scope of the appended claims.

What is claimed:

1. A device for cleaning a conveyer belt of a machine for manufacturing a material web, comprising:
    at least one cleaning nozzle which can be directed toward the conveyer belt for spraying the conveyer belt with a cleansing agent;
    a cleaning hood forming an interior chamber surrounding the cleaning nozzle; and
    at least one additional nozzle provided in a peripheral region of said cleaning hood for spraying the conveyer belt substantially tangentially with cleansing agent.

2. A cleaning device in accordance with claim 1, wherein the cleansing agent emanating from said at least one additional nozzle strikes a cleansing area of the conveyer belt and is directed toward the interior chamber of said cleaning hood.

3. A cleaning device in accordance with claim 1, further comprising a guide vane which diverts the cleansing agent emanating from said at least one additional nozzle away from the surface of the cleansing area.

4. A cleaning device in accordance with claim 1, wherein the interior chamber of the cleaning hood is provided with a partial vacuum.

5. A cleaning device in accordance with claim 1, wherein the cleansing agent comprises one of a gaseous and a liquid cleansing agent.

6. A cleaning device in accordance with claim 1, wherein said at least one additional nozzle comprises a slit nozzle provided in at least a portion of the peripheral region of said cleaning hood.

7. A cleaning device in accordance with claim 1, wherein said at least one additional nozzle is arranged subsequent to the cleaning nozzle, in the direction of movement of the conveyer belt.

8. A cleaning device in accordance with claim 1, wherein said cleaning nozzle comprises a rotatable nozzle head having at least one driving jet and at least one spraying nozzle for the cleaning agent.

9. A cleaning device in accordance with claim 1, wherein said cleansing agent comprises hot, dry air which reduces moisture content of the conveyer belt in addition to removing contamination.

10. The device of claim 1, wherein the material web comprises, on of, a paper web or cardboard web.

11. The device in accordance with claim 1, wherein the cleaning hood is bell-shaped.

12. A cleaning device in accordance with claim 1, wherein the interior chamber of said cleaning hood is provided with a vacuum, and the cleansing agent is sucked through said at least one additional nozzle into the interior chamber.

13. A cleaning device in accordance with claim 1, wherein the conveyer belt comprises one of a dry sieve belt, a wet sieve belt and a felt belt.

14. A device for cleaning a conveyer belt of a machine for manufacturing a material web, comprising:
    at least one cleaning nozzle which can be directed toward the conveyer belt for spraying the conveyer belt with a cleansing agent;
    a cleaning hood forming an interior chamber surrounding the cleaning nozzle; and
    at least one additional nozzle provided in a peripheral region of said cleaning hood for spraying the conveyer belt substantially tangentially with cleansing agent;
    wherein the cleansing agent is introduced into the interior chamber of said cleaning hood in a pressurized state.

15. The cleaning device in accordance with claim 5, wherein the cleansing agent emanating from said at least one additional nozzle strikes a cleansing area of the conveyer belt and is directed toward the interior chamber of said cleaning hood.

16. The device in accordance with claim 14, wherein the cleaning hood is bell-shaped.

17. A process for cleaning a conveyer belt of a machine for manufacturing a material web, comprising:

spraying the conveyer belt with a cleansing agent from at least one cleaning nozzle in a direction toward the conveyer belt;

forming an interior chamber surrounding the cleaning nozzle by providing a cleaning hood positioned over the conveyer belt; and spraying the conveyer belt, substantially tangentially, with cleansing agent from at least one additional nozzle provided in a peripheral region of the cleaning hood.

18. A process for cleaning a conveyer belt in accordance with claim 17, further comprising striking a cleansing area of the belt with the cleansing agent from the at least one additional nozzle in a direction toward the interior chamber of the cleaning hood.

19. A process for cleaning a conveyer belt in accordance with claim 17, further comprising diverting the cleansing agent emanating from the at least one additional nozzle away from the surface of the cleansing area.

20. A process for cleaning a conveyer belt in accordance with claim 17, further comprising providing a partial vacuum within the interior chamber of the cleaning hood.

21. A process for cleaning a conveyer belt in accordance with claim 17, further comprising introducing the cleansing agent into the interior chamber of the cleaning hood in a pressurized state and thereby causing a suction effect.

22. A process for cleaning a conveyer belt in accordance with claim 17, further comprising providing the interior chamber of the cleaning hood with a vacuum, and sucking the cleansing agent through the at least one additional nozzle into the interior chamber.

23. A process for cleaning a conveyer belt in accordance with claim 17, wherein the cleansing agent comprises one of a gaseous and a liquid cleansing agent.

24. A process for cleaning a conveyer belt in accordance with claim 17, wherein the cleansing agent comprises hot, dry air which reduces moisture content of the conveyer belt in addition to removing contamination.

25. The process in accordance with claim 17, wherein the cleaning hood is bell-shaped.

26. The process of claim 17, wherein the material web comprises, one of, a paper web or cardboard web.

* * * * *